United States Patent
Ha et al.

(10) Patent No.: US 10,141,127 B2
(45) Date of Patent: Nov. 27, 2018

(54) HIGH-SPEED COMMUNICATIONS COUPLING FOR USE IN A CIRCUIT BREAKER ASSEMBLY

(71) Applicant: ABB Schweiz AG, Baden (CH)

(72) Inventors: Joon Won Ha, Louisville, KY (US); Craig Benjamin Williams, Louisville, KY (US); Paresh Lele, Telangana (IN)

(73) Assignee: ABB Schweiz AG, Baden (CH)

( * ) Notice: Subject to any disclaimer, the term of this patent is extended or adjusted under 35 U.S.C. 154(b) by 85 days.

(21) Appl. No.: 14/970,769

(22) Filed: Dec. 16, 2015

(65) Prior Publication Data

US 2017/0178828 A1 Jun. 22, 2017

(51) Int. Cl.
| | |
|---|---|
| *H02B 11/00* | (2006.01) |
| *H01H 9/02* | (2006.01) |
| *H02B 11/133* | (2006.01) |
| *H02B 11/127* | (2006.01) |

(52) U.S. Cl.
CPC ......... *H01H 9/0271* (2013.01); *H02B 11/127* (2013.01); *H02B 11/133* (2013.01)

(58) Field of Classification Search
CPC ..... H02B 11/127; H02B 11/133; H02B 11/00; H02B 13/0356; H02B 13/045; H02B 1/056; H02B 1/52; H02B 3/00
USPC ....... 200/50.24, 50.21, 50.28, 50.3; 361/608, 361/609, 64; 439/540.1
See application file for complete search history.

(56) References Cited

U.S. PATENT DOCUMENTS

| | | | |
|---|---|---|---|
| 6,654,216 B2 | 11/2003 | Horvath et al. | |
| 8,374,727 B2 | 2/2013 | Wimmer | |
| 8,385,038 B2 | 2/2013 | Saito et al. | |
| 2008/0013907 A1* | 1/2008 | Zumovitch | G02B 6/4464 385/134 |
| 2008/0079437 A1* | 4/2008 | Robarge | G01R 15/146 324/522 |

(Continued)

FOREIGN PATENT DOCUMENTS

| | | |
|---|---|---|
| CN | 201877891 U | 6/2011 |
| CN | 202282647 U | 6/2012 |

(Continued)

OTHER PUBLICATIONS

Ingram, D.M.E et al., "Network Interactions and Performance of a Multifunction IEC 61850 Process Bus", Industrial Electronics, IEEE Transactions on vol. 60 , Issue: 12, pp. 5933-5942, Dec. 2013.

*Primary Examiner* — Ahmed Saeed
(74) *Attorney, Agent, or Firm* — Barnes & Thornburg LLP

(57) ABSTRACT

A secondary disconnect assembly for use with a circuit breaker moveable between a connected position and a disconnected position includes a first secondary disconnect apparatus and a second secondary disconnect apparatus. The first secondary disconnect apparatus includes a first coupling portion having at least one high speed communications connector. The second secondary disconnect apparatus includes a second coupling portion removably coupled to the first coupling portion. The second coupling portion includes at least one opening configured to receive the high speed communications connector when the circuit breaker is moved from the disconnected position to the connected position to enable high speed data transmission through the first coupling portion and the second coupling portion.

14 Claims, 12 Drawing Sheets

(56) References Cited

U.S. PATENT DOCUMENTS

| | | | | |
|---|---|---|---|---|
| 2011/0217867 A1* | 9/2011 | Allwood | ............. | H01R 9/2416 |
| | | | | 439/488 |
| 2013/0163165 A1* | 6/2013 | Hyrenbach | .......... | H02B 13/045 |
| | | | | 361/679.01 |
| 2013/0194059 A1* | 8/2013 | Parr | ........................ | H02B 1/52 |
| | | | | 336/65 |
| 2014/0094059 A1* | 4/2014 | Pepe | .................. | H01R 13/6658 |
| | | | | 439/540.1 |
| 2015/0326001 A1 | 11/2015 | Emerson et al. | | |
| 2016/0020053 A1* | 1/2016 | Dozier | ...................... | H02P 1/26 |
| | | | | 200/50.21 |
| 2016/0156164 A1* | 6/2016 | Yang | ...................... | H01H 33/46 |
| | | | | 200/50.24 |
| 2016/0294191 A1* | 10/2016 | Armstrong | ............. | H02S 30/20 |

FOREIGN PATENT DOCUMENTS

| | | |
|---|---|---|
| CN | 203013082 U | 6/2013 |
| CN | 103269126 A | 8/2013 |
| CN | 203312914 U | 11/2013 |

\* cited by examiner

HIGH-SPEED COMMUNICATIONS COUPLING FOR USE IN A CIRCUIT BREAKER ASSEMBLY

BACKGROUND

The field of the disclosure relates generally to a circuit breaker assembly and, more particularly, to high-speed couplings for use in circuit breaker assemblies and methods of assembling such couplings.

Conventional electrical distribution systems employ switching devices, such as for example, circuit breakers in switchgear applications, are conventionally housed in a metal enclosure or "drawout" unit. The drawout units releasably connect the electrical switching devices to an electrical busbar. It is sometimes necessary, such as for scheduled maintenance or testing purposes, to move, or "rack", the circuit breaker in and out of the enclosure to make and break electrical connection within an electrical power distribution circuit. Conventional drawout units are configured to rack the circuit breakers between a disconnect position, in which the primary contacts or terminals of the circuit breaker are fully disengaged from mating primary contacts within the enclosure, and a connect position in which the primary contacts of the circuit breaker and enclosure are fully engaged. A racking mechanism is typically employed to ensure steady movement of the circuit breaker as it moves between the disconnected and connected positions.

Circuit breakers are also typically equipped with a variety of auxiliary electronic devices and related control circuitry, including switches, motors, solenoids and the like, for providing control of various functions of the circuit breaker. In such cases, terminals are conventionally arranged on the outside surface of the circuit breaker assembly to provide power to the auxiliary devices and control circuitry, and arranged for automatic connection and disconnection from corresponding mating terminals or contacts arranged within the enclosure. Such corresponding terminals arranged on the circuit breaker and the enclosures are conventionally referred to as "secondary disconnect" terminals or contacts, to distinguish these terminals from the main or "primary" current-carrying circuit breaker and enclosure terminals.

When the circuit breaker is inserted, or racked in, from the disconnect position to the connect position, the corresponding secondary disconnect terminals on the circuit breaker and enclosure must be engaged for power to provided to the auxiliary devices and control electronics. Conversely, when the circuit breaker is removed, or racked out, to the disconnect position, the secondary disconnect terminals must be disengaged. Additionally, it is common to provide a test position, between the connected and disconnected positions of the circuit breaker, wherein the secondary disconnect terminals are engaged, but the primary terminals are not engaged. In such cases, the auxiliary functions of the circuit breaker can be safely tested while the circuit breaker is disconnected from the primary circuit, or "OFF".

At least some known circuit breakers include secondary disconnects rated for between 400-600 volts, and, as such, require relatively large size conductors to accommodate current and larger creepage and clearance spacing to accommodate voltage. As such, at least some known secondary disconnect constructions are not be optimal for CAT5 and CAT6 high speed connections, such as those used in typical Ethernet and HDMI communications, which require signal level voltages typically under 24 volts. Such high speed communications connectors are generally smaller and have less contacting engagement than connectors used for relatively slower speed communications, such as CAT4 communications cables. As such, at least some known circuit breakers position a high speed communications connector outside the main breaker. However, in order to transmit data through the high speed connector, such circuit breakers convert the data into different data types, which slows the data output and prevents the circuit breaker from transmitting the high speed data in real time.

For at least the reasons stated above, a need exists for a circuit breaker having a high speed communications connector embedded in the primary electronics to enable transmission of high speed communications data and arranged for automatic connection and disconnection from corresponding mating terminals or contacts arranged within the enclosure.

BRIEF DESCRIPTION

In one aspect, secondary disconnect assembly for use with a circuit breaker moveable between a connected position and a disconnected position is provided. The secondary disconnect assembly includes a first secondary disconnect apparatus including a first coupling portion having at least one high speed communications connector. The secondary disconnect assembly also includes a second secondary disconnect apparatus including a second coupling portion removably coupled to the first coupling portion. The second coupling portion includes at least one opening configured to receive the high speed communications connector when the circuit breaker is moved from the disconnected position to the connected position to enable high speed data transmission through the first coupling portion and the second coupling portion.

In another aspect, a circuit breaker assembly is provided. The circuit breaker assembly includes a cassette and a first secondary disconnect apparatus pivotally coupled to the cassette. The first secondary disconnect apparatus includes a first coupling portion including at least one high speed communications connector. The circuit breaker assembly also includes a circuit breaker removably coupled within the cassette. The circuit breaker is moveable between a connected position and a disconnected position. The circuit breaker assembly also includes a second secondary disconnect apparatus coupled to the circuit breaker. The second secondary disconnect apparatus includes a second coupling portion removably coupled to the first coupling portion. The second coupling portion includes at least one opening configured to receive the high speed communications connector when the circuit breaker is moved from the disconnected position to the connected position to enable high speed data transmission through the first coupling portion and the second coupling portion.

In yet another aspect, method of assembling a circuit breaker assembly is provided. The method includes pivotally coupling a first secondary disconnect apparatus to a cassette. The first secondary disconnect apparatus includes a first coupling portion including at least one high speed communications connector. The method also includes removably coupling a circuit breaker to the cassette, wherein the circuit breaker is moveable between a connected position and a disconnected position. A second secondary disconnect apparatus is coupled to the circuit breaker, wherein the second secondary disconnect apparatus includes a second coupling portion. The method further includes removably coupling the second coupling portion to the first coupling portion, wherein the second coupling portion includes at least one opening configured to receive the high speed communications connector when the circuit breaker is moved from the disconnected position to the connected position to enable high speed data transmission through the first coupling portion and the second coupling portion.

DETAILED DESCRIPTION

Figure 1:
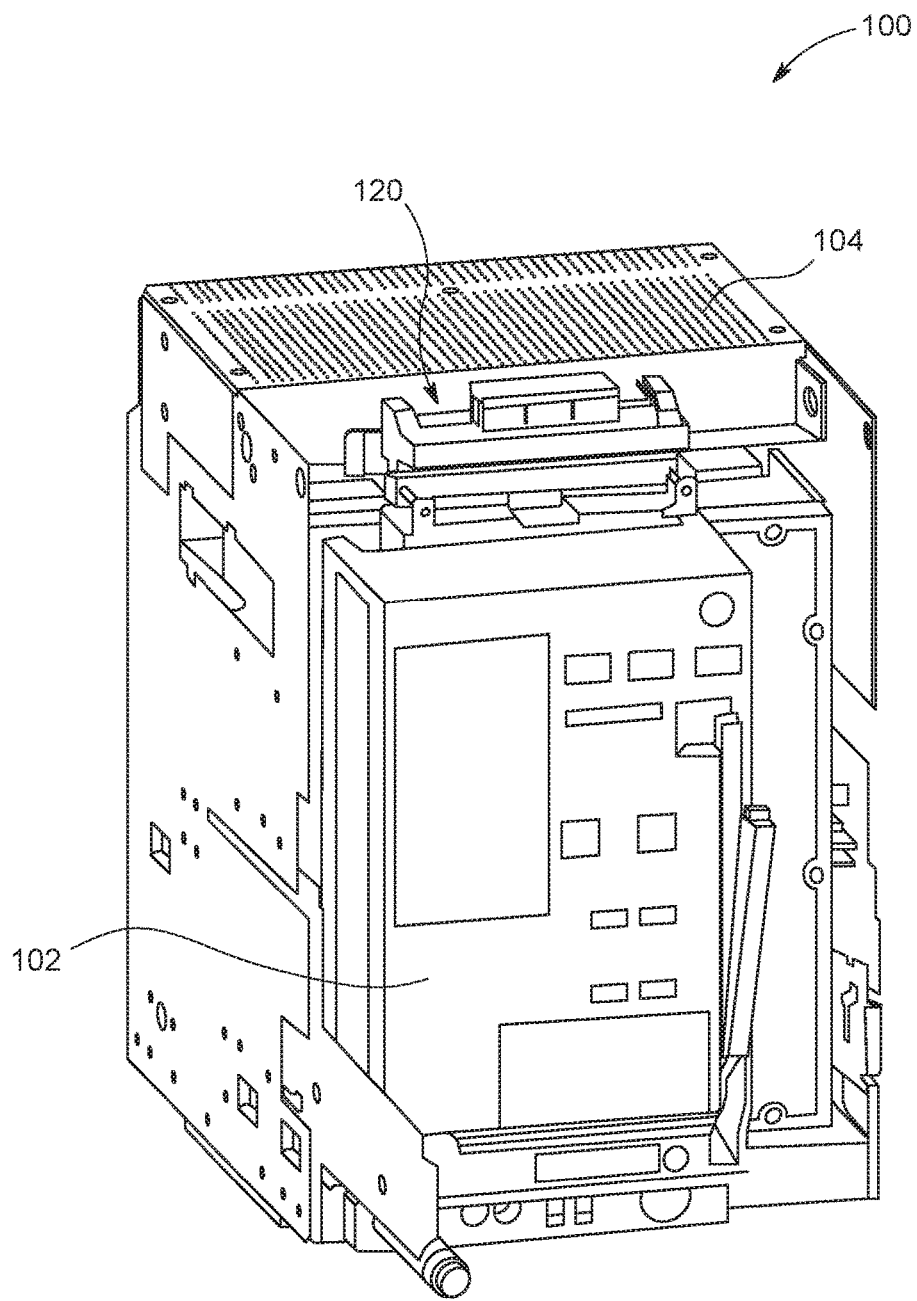
FIG. 1 is a perspective view of an exemplary circuit breaker assembly.
Figure 2:
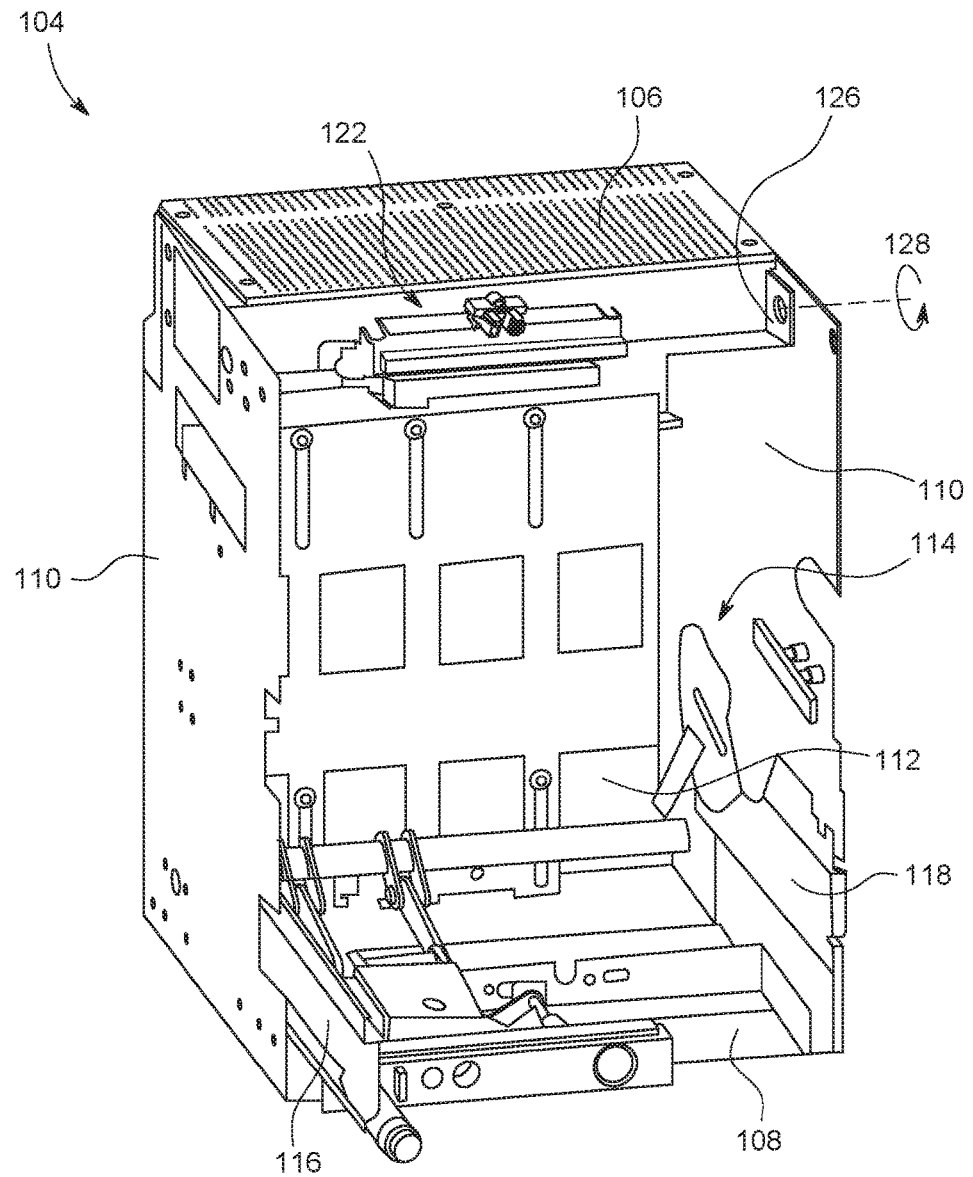
FIG. 2 is a perspective view of a cassette portion of the circuit breaker assembly shown in FIG. 1.
Figure 3:
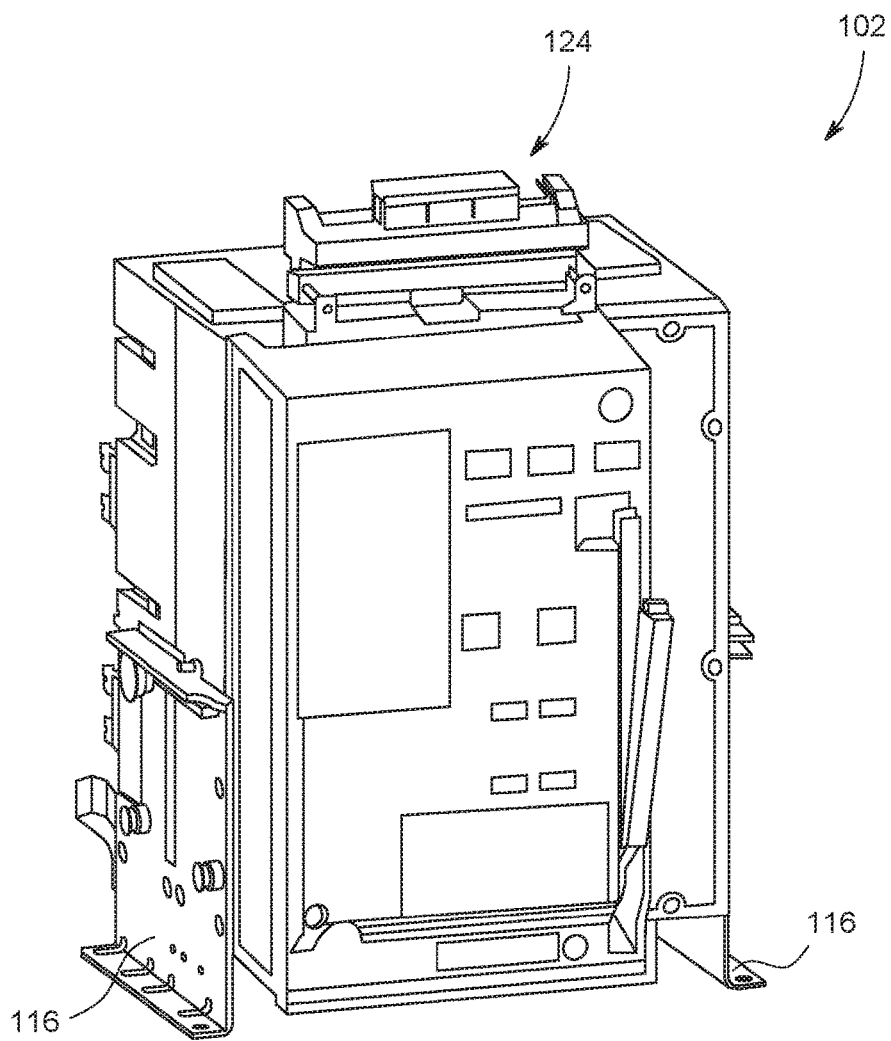
FIG. 3 is a perspective view of a circuit breaker portion of the circuit breaker assembly shown in FIG. 1.

FIGS. 1-3 illustrates an exemplary embodiment of a circuit breaker assembly 100 including a circuit breaker 102 removably mounted within a housing, or cassette 104. In the exemplary embodiment, cassette 104 includes a top wall 106, a bottom wall 108, a pair of sidewalls 110, and a rear wall 112 that define a cavity 114. Circuit breaker 102 is configured for racking into and out of cavity 114 of cassette 104. Circuit breaker 102 is mounted on a carriage 116, which in turn is supported for racking by opposed telescoping side rail assemblies 118 mounted to housing sidewalls 110. Circuit breaker 102 is configured to control power to one or more loads (not shown), and to interrupt current flow to a load when a short or fault is detected. Loads may include, for example and without limitation, machinery, motors, lighting, and/or other electrical and mechanical equipment of a manufacturing facility, a power generation facility, or a power distribution facility. Circuit breaker 102 is coupled to a power supply (not shown) via a bus bar (not shown), and is coupled to one or more loads via a conductive cable (not shown).

Circuit breaker 102 includes a plurality of circuit breaker primary disconnect terminals (not shown), each configured and located to engage with a corresponding housing primary disconnect terminal (not shown) positioned within cassette 104. Additionally, circuit breaker 102 includes at least one secondary disconnect terminal assembly 120 including a cassette secondary disconnect apparatus 122 and a corresponding circuit breaker secondary disconnect apparatus 124 located to slidably engage with cassette secondary disconnect apparatus 122. In the exemplary embodiment, cassette secondary disconnect apparatus 122 is coupled to top wall 106 between sidewalls 110 via a set of pivot bosses 126 that extend along a rotational axis 128. Cassette secondary disconnect apparatus 122 is therefore configured to rotate about the rotational axis 128 between at least a first (that is, a service) position and a second (that is, a wiring) position.

Here, while cassette secondary disconnect apparatus 122 is coupled to top wall 106 of cassette 104, it is understood that embodiments of the disclosure exist in which cassette secondary disconnect apparatus 122 is coupled to other cassette walls, for example, sidewalls 110, in a similar manner as described above.

Figure 4:
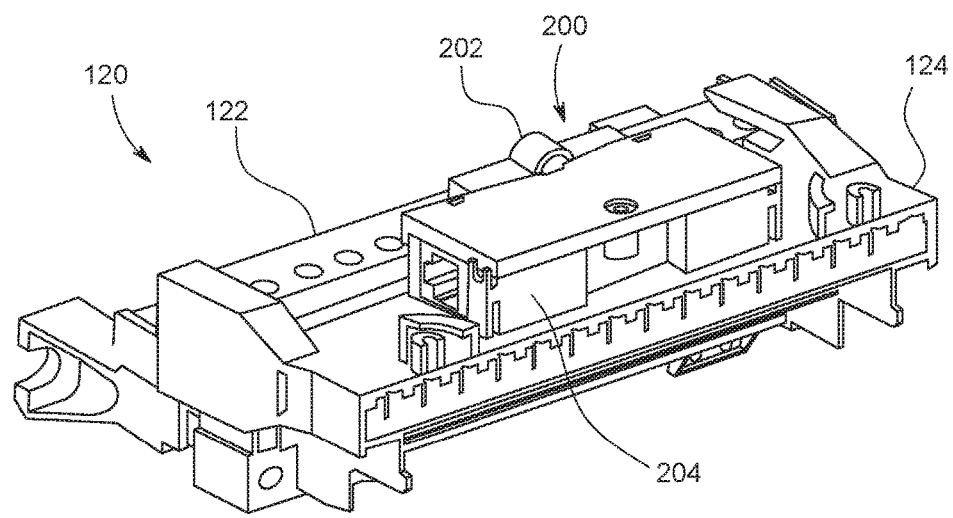
FIG. 4 is a perspective view of an exemplary secondary disconnect terminal assembly that may be used with the circuit breaker assembly shown in FIG. 1.

Referring now to FIG. 4, in the exemplary embodiment, circuit breaker assembly 100 also includes a high speed communications coupling 200 coupled to secondary disconnect terminal assembly 120. More specifically, coupling 200 includes a cassette coupling portion 202 integrally formed with cassette secondary disconnect apparatus 122 and a breaker coupling portion 204 integrally formed with breaker secondary disconnect apparatus 124. As used herein, the term "high speed communication" is meant to describe data communication using CAT5 and CAT6 high speed communications cables, such as those used in typical Ethernet and HDMI communications. Alternatively, any type of high speed communications cables may be used that enable transfer of high speed data through circuit breaker assembly 100. Additionally, at least some high speed data communications transmissions are performed in real time. As used herein, the term "real time" refers to at least one of the time of occurrence of the associated events, the time of measurement and collection of predetermined data, the time to process the data, and the time of a system response to the events and the environment. In the embodiments described herein, these activities and events occur substantially instantaneously.

As described in further detail below, cassette coupling portion 202 and breaker coupling portion 204 enable the high speed communication transmission though coupling 200 to be maintained even when circuit breaker 102, and therefore secondary disconnect assembly 120, is in the disconnected position.

Figure 5:
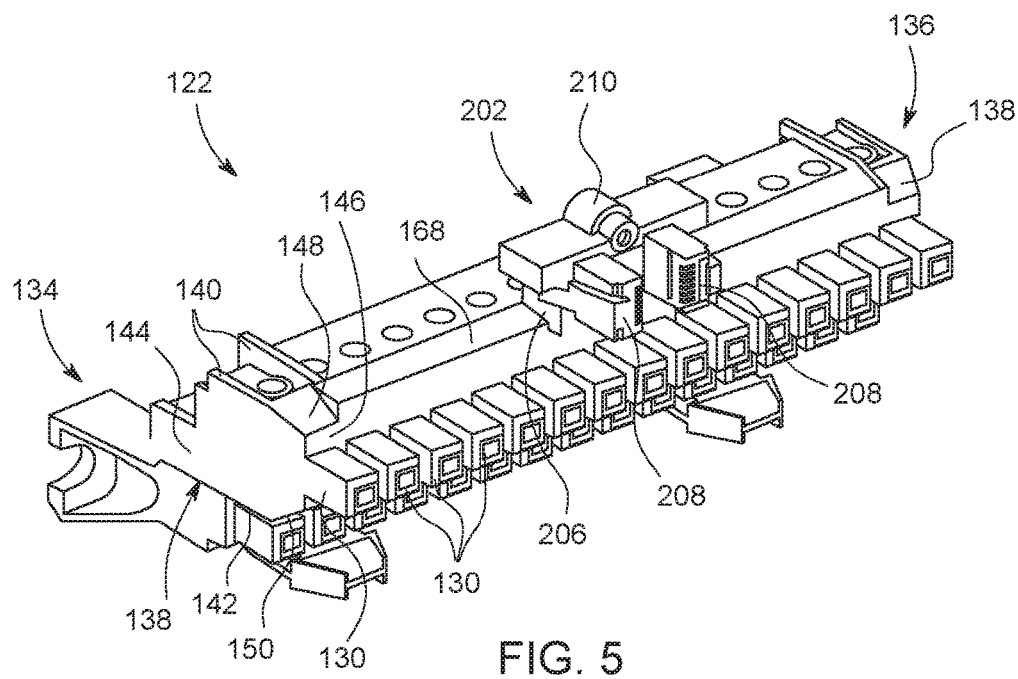
FIG. 5 is a front perspective view of an exemplary cassette secondary disconnect apparatus that may be used with the secondary disconnect terminal assembly shown in FIG. 4.
Figure 6:
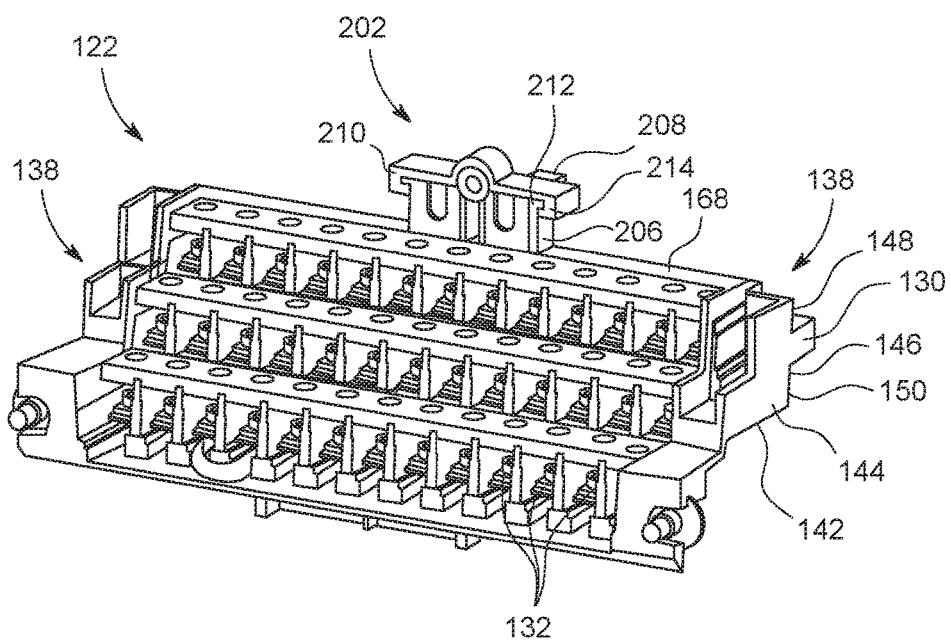
FIG. 6 is a rear perspective view of the cassette secondary disconnect apparatus.
Figure 7:
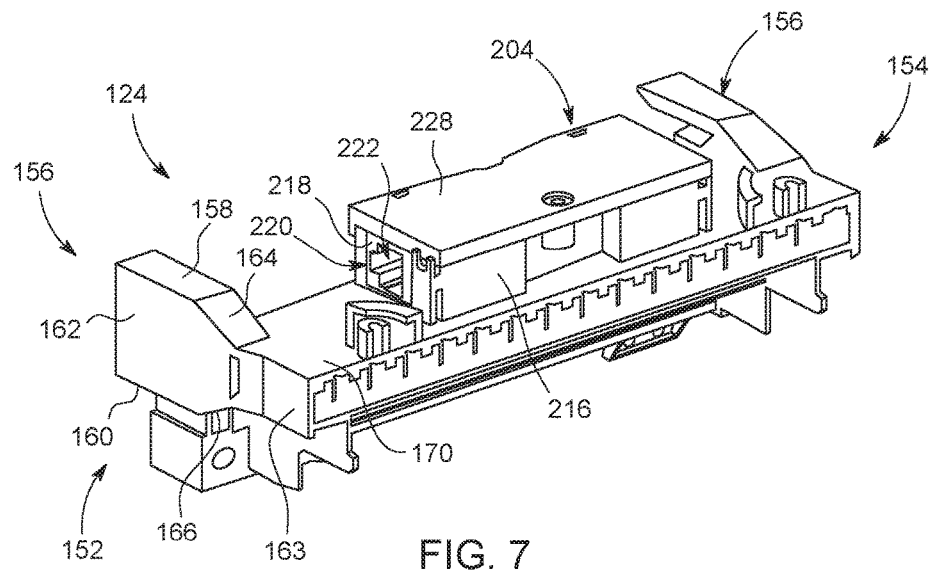
FIG. 7 is a front perspective view of an exemplary breaker secondary disconnect apparatus that may be used with the secondary disconnect terminal assembly shown in FIG. 4.
Figure 8:
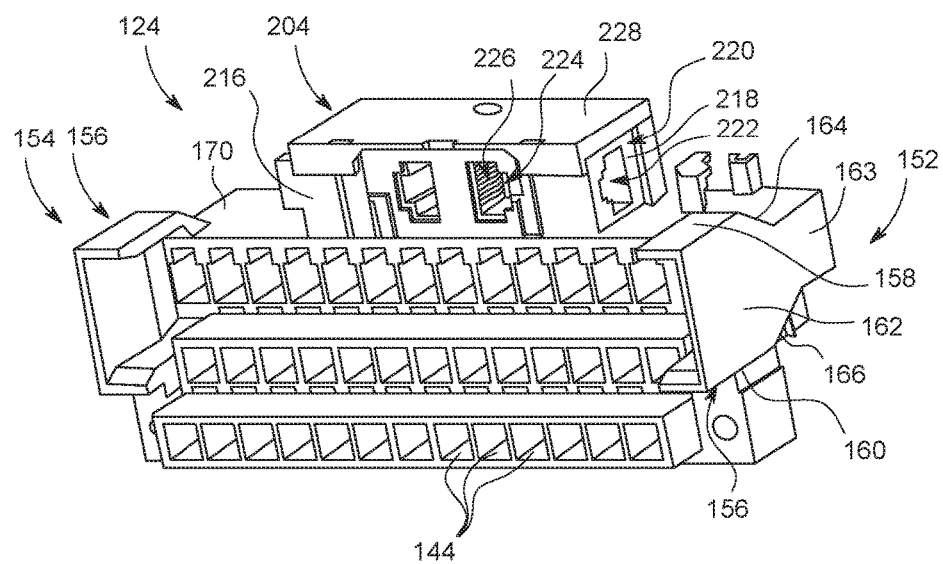
FIG. 8 is a rear perspective view of the breaker secondary disconnect apparatus.
Figure 9:
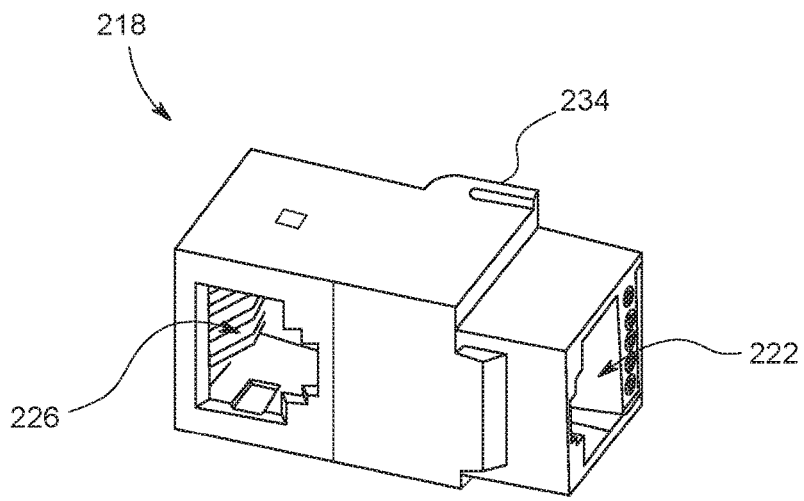
FIG. 9 is a perspective view of a coupler that may be used with the breaker secondary disconnect apparatus shown in FIG. 6.
Figure 10:
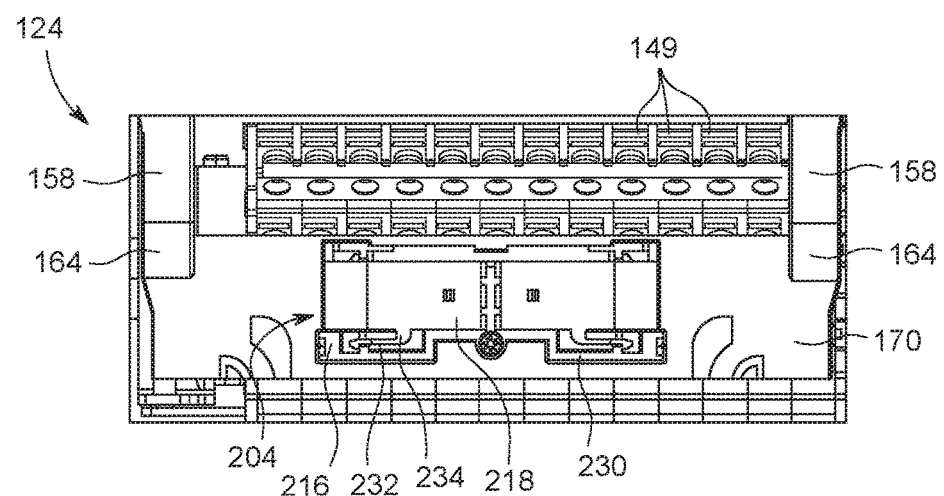
FIG. 10 is a top view of the breaker secondary disconnect apparatus shown in FIG. 6.

FIG. 5 is a front perspective view of cassette secondary disconnect apparatus 122, and FIG. 6 is a rear perspective view of cassette secondary disconnect apparatus 122. FIG. 7 is a front perspective view of breaker secondary disconnect apparatus 124, and FIG. 8 is a rear perspective view of breaker secondary disconnect apparatus 124.

In the exemplary embodiment, cassette coupling portion 202 is coupled to breaker coupling portion 204 to form self-aligning high speed communication coupling 200. As described above, circuit breaker 102 can be racked along carriage 116 between a disconnect position, where communication between the circuit breaker primary disconnect and the power supply is terminated, and the connect position, where the circuit breaker primary disconnect is in communication with the power supply. In the exemplary embodiment, coupling 200 is a self-aligning coupling that includes alignment features that enable cassette coupling portion 202 to mate with breaker coupling portion 204 to automatically realign coupling portions 202 and 204.

Cassette secondary disconnect apparatus 122 includes a plurality of female terminal housings 130 integrally formed with apparatus 122 and configured to house a respective one of a plurality of female terminals 132 therein.

In the exemplary embodiment, terminal apparatus 122 also includes a first end 134 and an opposite second end 136, each including an alignment feature 138. Alignment feature 138 includes a top surface 140, a bottom surface 142, and a sidewall 144 extending therebetween. Alignment feature 138 also includes a front surface 146 extending between surfaces 140 and 142 and perpendicular to sidewall 144, wherein at least one female terminal housing 130 extends outward from front surface 146. Furthermore, in the exemplary embodiment, alignment feature 138 includes a first angled surface 148 extending between top and front surfaces 140 and 146, and also a second angled surface 150 extending between bottom surface 142 and front surface 146. As described in further detail below, angled surfaces 148 and 150 are configured to engage a corresponding angled surface on breaker secondary disconnect apparatus 124 to facilitate coupling apparatus 122 to apparatus 124.

Referring to FIGS. 7 and 8, circuit breaker secondary disconnect apparatus 124 includes a plurality of male terminal housings 149 that are each configured to receive one of the plurality of female terminal housings 130 on cassette secondary disconnect apparatus 122. In particular, the set of male terminal housings 149 positionally cooperates with the female terminal housings 130 when the cassette-side terminal apparatus 122 is in the service position and when the rack-in operation has been completed to, at least, the test position and/or the connected position. Further, the set of male terminal housings 149 is positionally non-cooperative with the female terminal housings 130 when the cassette-side terminal apparatus 122 is in the disconnected position.

In the exemplary embodiment, breaker secondary disconnect apparatus 124 includes a first end 152 and an opposite second end 154, each including a second alignment feature 156. Alignment feature 156 includes a top surface 158, a bottom surface 160, and a sidewall 162 extending therebetween. Alignment feature 156 also includes a portion 163 for receiving female terminal housing 130 extending from front surface 146 of first alignment feature 138 of cassette secondary disconnect apparatus 122. In the exemplary embodiment, second alignment feature 156 includes a first angled surface 164 extending between top surface 158 and portion 163 and a second angled surface 166 extending between bottom surface and portion 163.

Alignment features 138 and 156 facilitate automatically realigning apparatuses 122 and 124 to enable self-coupling of apparatuses 122 and 124. More specifically, female terminal housing 130 is inserted into portion 163 and angled surfaces 148 and 150 of alignment feature 138 engage angled surfaces 164 and 166 of alignment feature 156. Apparatus 124 is pushed forward such that alignment feature 138 is seated substantially within alignment feature 156. In operation, removal of circuit breaker 102 from cassette 104 causes alignment features 138 and 156 to automatically disengage from each other. Similarly, racking circuit breaker 102 into cassette 104 causes alignment features 138 and 156 to automatically engage and couple apparatuses 122 and 124. Specifically, angled surfaces 148 and 150 of alignment feature 138 engage angled surfaces 164 and 166 of alignment feature 156 when circuit breaker 102 is moved from the disconnected position to the connected position to enable high speed data transmission through cassette coupling portion 202 and breaker coupling portion 204 of high speed coupling 200. In situations where alignment feature 138 is misaligned with second alignment feature 156 by more than a predetermined tolerance, apparatuses 122 and 124 are prevented from mating.

Referring again to FIGS. 5 and 6, first high speed coupling portion 202 on cassette secondary disconnect apparatus 122 includes a body portion 206 extending upward from a top surface 168 of apparatus 122. In the exemplary embodiment, body portion 206 is integrally formed with apparatus 122. Alternatively, body portion 206 is a separate component coupled to apparatus 122 by any known means. Body portion 206 forms at least one housing configured to receive a high speed connector 208 therein. A cover 210 is coupled over the at least one connector 208 to retain connectors 208 within body portion 206. Specifically, cover 210 includes at least one hook portion 214 configured to engage at least one flange 212 formed on body portion 206.

Referring now to FIGS. 7-10, second high speed coupling portion 204 on breaker secondary disconnect apparatus 124 includes a body portion 216 extending upward from a top surface 170 of apparatus 124. In the exemplary embodiment, body portion 216 is integrally formed with apparatus 124. Alternatively, body portion 216 is a separate component coupled to apparatus 124 by any known means. Body portion 216 forms at least one housing configured to receive a high speed coupler 218 therein. In the exemplary embodiment, coupler 218 is configured to couple a load (not shown) with the power source in circuit breaker assembly 100 through high speed communications coupling 200. Specifically, body 216 includes a first body opening 220 that aligns with a first coupler opening 222 such that openings 220 and 222 are configured to receive a high speed communications connector 208 therein. Additionally, body 216 includes a second body opening 224 that aligns with a second coupler opening 226 such that openings 224 and 226 are configured to receive high speed communications connector 208 from cassette coupling portion 202 therein. In the exemplary embodiment, body openings 220 and 224 are oriented ninety degrees from one another. Similarly, coupler openings 222 and 226 are oriented ninety degrees from one another. Breaker coupling portion 204 also includes a cover 228 coupled to body portion 216 to retain couplers 218 within body portion 216.

In the exemplary embodiment, body 216 includes a front wall 230 having at least one slot 232 formed therein. Coupler 218 includes a projection 234 extending from a wall of coupler 218 opposite second opening 226. Coupler 218 is inserted into body 216 such that slot 232 defined in front wall 230 receives projection 234. Projection 234 and slot 232 cooperate to restrict movement of coupler 218 within body portion 216.

In operation, a user inserts a high speed communications connector from their load into first openings 220 and 222 of body 216 and coupler 218, respectively. Then, beginning in the disconnected position, the user racks circuit breaker 102, and therefore circuit breaker secondary disconnect apparatus 124 and breaker coupling portion 204, into cassette 104. Housing receiving portion 163 of alignment feature 156 receives female housing 130 that extends from front surface 146 of alignment feature 138. As circuit breaker 102 is racked, angled surfaces 148 and 150 alignment feature 138 engage and mate with angled surfaces 164 and 166 of alignment feature 156 such that alignment feature 138 is seated within alignment feature 156. As features 138 and 156 are being seated, connectors 208 on cassette coupling portion 202 are received by second openings 224 and 226 in a snap-fit attachment such that cassette coupling portion 202 and breaker coupling portion 204 are coupled together. In such a configuration, high speed communications signals may be transmitted from breaker coupling portion 204 through coupler 218 and into cassette coupling portion 202 via connector 208.

Figure 11:
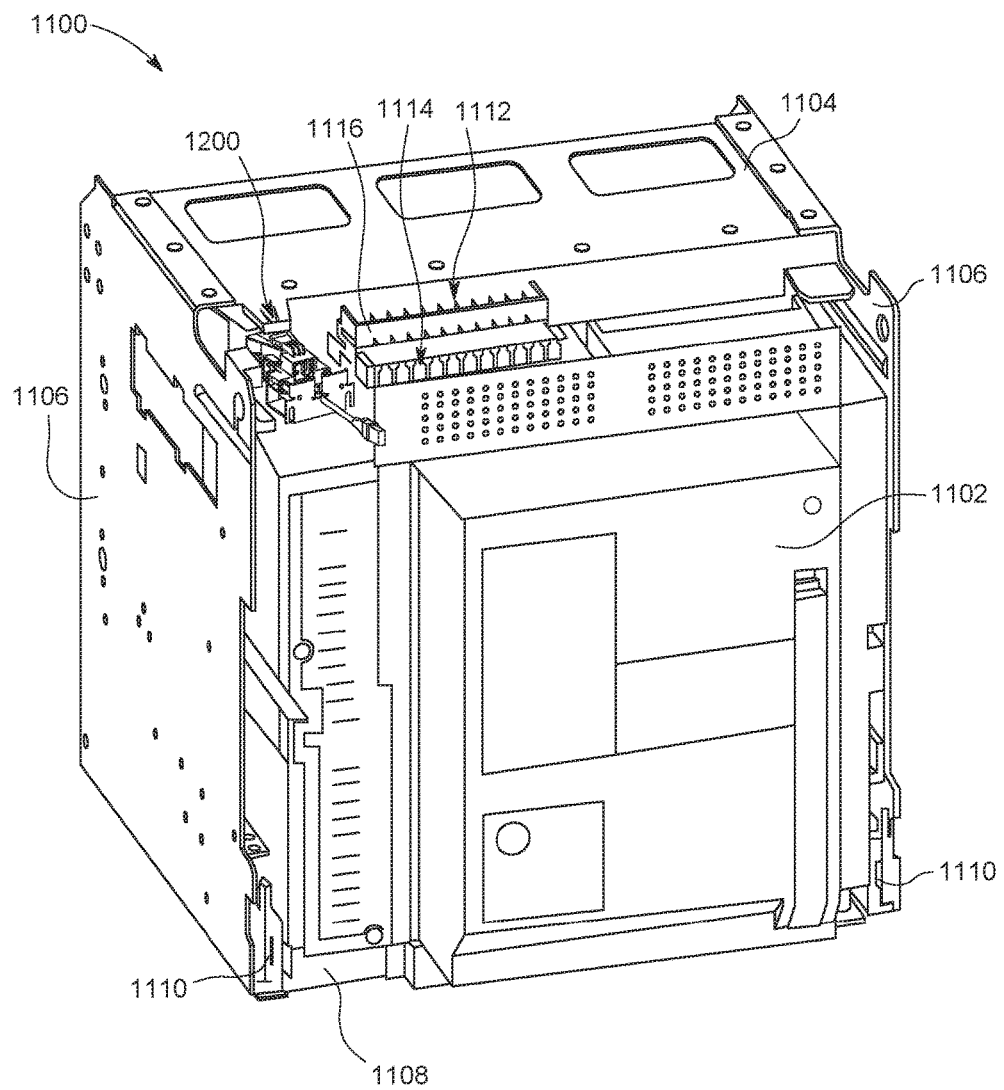
FIG. 11 is a perspective view of an alternative circuit breaker.

FIG. 11 illustrates an alternative embodiment of a circuit breaker assembly 1100 including a circuit breaker 1102 mounted within a cassette, or housing 1104. In one embodiment, housing 1104 includes a pair of sidewalls 1106 and circuit breaker 1102 is configured for racking into and out of housing 1102. Circuit breaker 1102 is mounted on a carriage 1108, which in turn is supported for racking by opposed telescoping side rail assemblies 1110 mounted to housing sidewalls 1106. Circuit breaker 1102 is configured to control power to one or more loads (not shown), and to interrupt current flow to a load when a short or fault is detected. Loads may include, for example and without limitation, machinery, motors, lighting, and/or other electrical and mechanical equipment of a manufacturing facility, a power generation facility, or a power distribution facility. Circuit breaker 1102 is coupled to a power supply (not shown) via a bus bar (not shown), and is coupled to one or more loads via a conductive cable (not shown).

Circuit breaker 1102 includes a plurality of circuit breaker primary disconnect terminals (not shown), each configured and located to engage with a corresponding housing primary disconnect terminal (not shown) positioned within housing 1104. Additionally, circuit breaker 1102 includes at least one secondary disconnect terminal assembly 1112 including a circuit breaker secondary terminal apparatus 1114 configured and located to slidably engage with a corresponding housing secondary disconnect apparatus 1116.

In the exemplary embodiment, circuit breaker assembly 1100 also includes a high speed communications coupling 1200 coupled to housing 1104. More specifically, coupling 1200 is coupled to one of sidewalls 1106 and positioned proximate secondary disconnect assembly 1112. As used herein, the term "high speed communication" is meant to describe data communication using CAT5 and CAT6 high speed communications cables, such as those used in typical Ethernet and HDMI communications. Alternatively, any type of high speed communications cables may be used that enable transfer of high speed data through circuit breaker assembly 100. As used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

In the exemplary embodiment, coupling 1200 is formed separately from secondary disconnect assembly 1112. As such, circuit breaker assembly 1100 may include coupling 1200 and not secondary disconnect assembly 1112. As described in further detail below, independently formed coupling 1200 and secondary disconnect 1112 enables the high speed communication though coupling 1200 to be maintained even when circuit breaker 1102, and therefore secondary disconnect assembly 1112, is in the disconnected position. In another embodiment, at least a portion of coupling 1200 is integrally formed with a portion of secondary disconnect assembly 1112.

Figure 12:
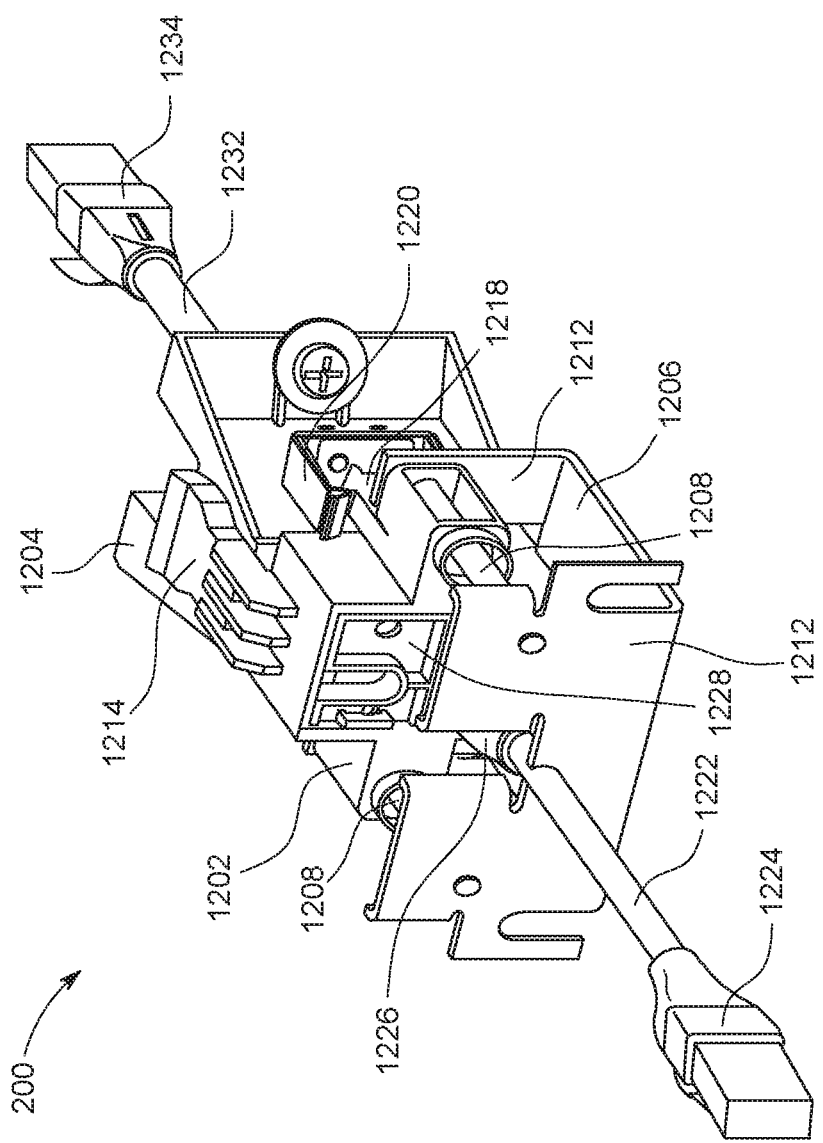
FIG. 12 is a perspective view of an alternative high speed communications coupling that may be used with the circuit breaker assembly shown in FIG. 11.
Figure 13:
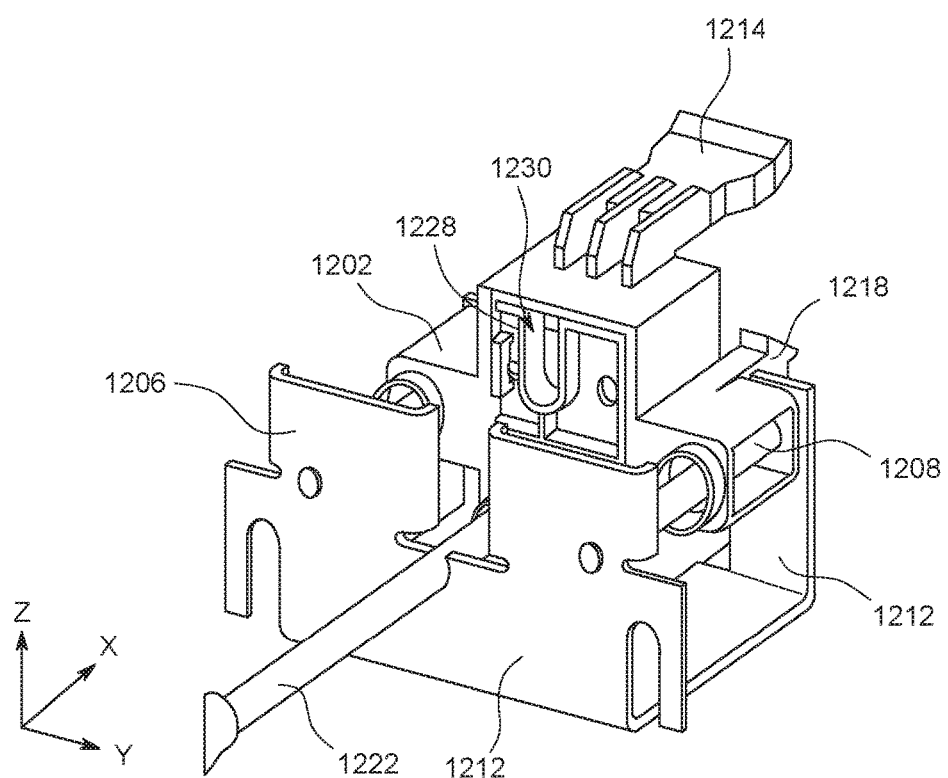
FIG. 13 is a perspective view of an alternative first connector of the high speed communications coupling shown in FIG. 12.
Figure 14:
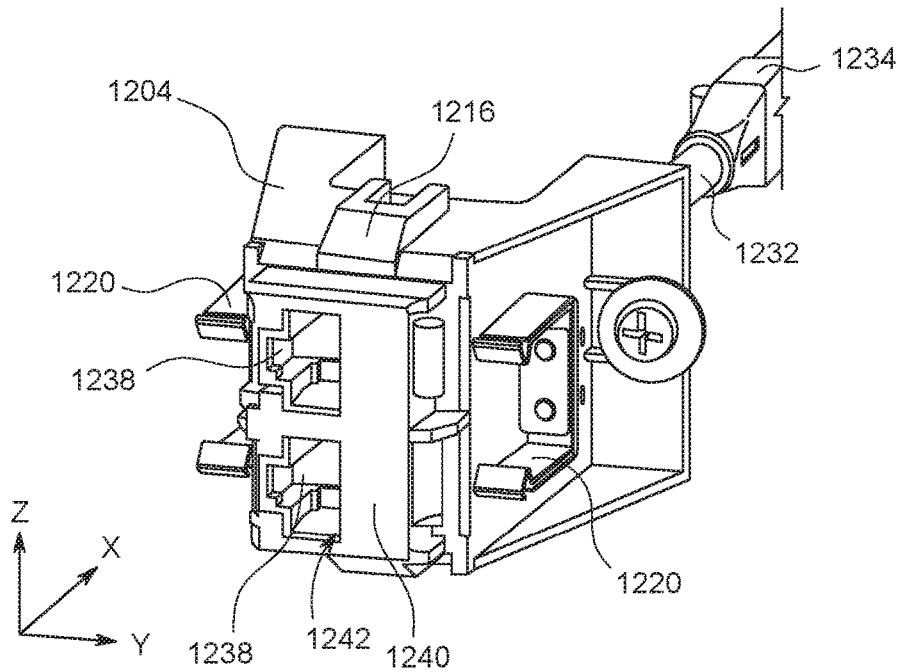
FIG. 14 is a perspective view of an alternative second connector of the high speed communications coupling shown in FIG. 12.
Figure 15:
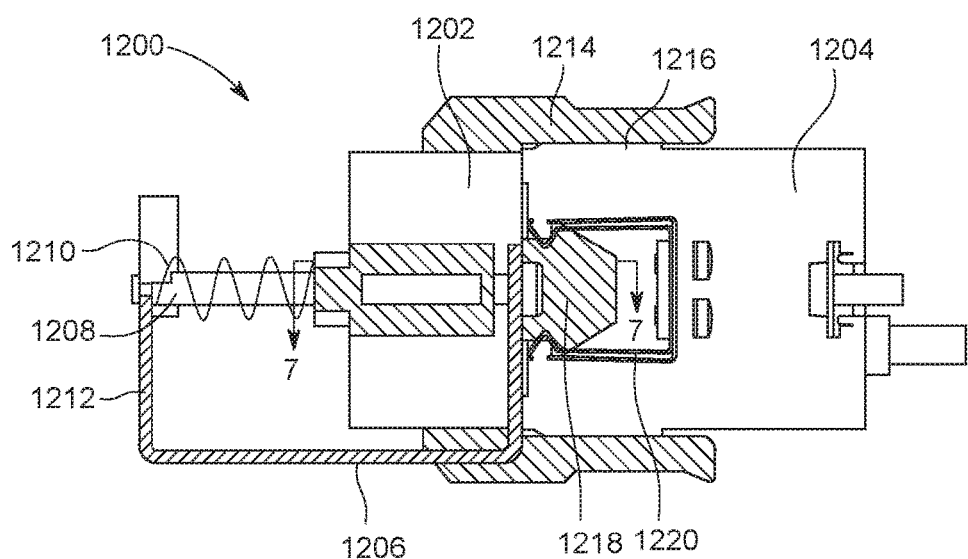
FIG. 15 is a side view of the high speed communications coupling shown in FIG. 12.

FIG. 12 is a perspective view of high speed communications coupling 1200 that may be used with circuit breaker assembly 1100 (shown in FIG. 11). Coupling 1200 includes a first connector 1202, a second connector 1204, a frame 1206, a pair of rods 1208, and a spring 1210. FIG. 13 is a perspective view of a first connector 1202, frame 1206, and rods 1208 coupled together. FIG. 14 is a perspective view of second connector 1204, and FIG. 15 is a side view of high speed communications coupling 1200.

In one embodiment, first connector 1202 is coupled to second connector 1204 to form self-aligning high speed communication coupling 1200. As described above, circuit breaker 1102 can be racked along carriage 1108 between a disconnect position, where communication between the circuit breaker primary disconnect and the power supply is terminated, and the connect position, where the circuit breaker primary disconnect is in communication with the power supply. In the exemplary embodiment, coupling 1200 is a self-aligning coupling that includes alignment features that enable first connector 1202 to blind mate with second connector 1204 to automatically realign connectors 1202 and 1204.

In the exemplary embodiment, frame 1206 is coupled to a sidewall 1106 of housing 1102 (both shown in FIG. 11) and includes spaced apart walls 1212. First connector 1202 is coupled between walls 1210. More specifically, first connector 1202 includes a pair of openings through which a respective rod 1208 is inserted to couple first connector 1202 to frame 1208. Rods 1208 extend between and are coupled to walls 1212 such that rods 1208 provide a guide for first connector 1202 to be biased by spring 1210 in the X direction (shown in FIG. 13), as described in further detail below. Specifically, springs 1210 are coupled about rods 1208 such that first connector 1202 is positioned between springs 1210 and second connector 1204. Springs 1210 are configured to bias first connector 1202 toward one of walls 1212. In operation, when circuit breaker 1102 is racked to the disconnect position, first connector 1202 slides along rods 1208 in the X direction to maintain engagement with second connector 1204.

First connector 1202 includes a first alignment feature 1214 that mates with a second alignment feature 1216 on second connector 1204. As described above, alignment features 1214 and 1216 facilitate automatically realigning connectors 1202 and 1204 to enable self-coupling of coupling 1200. More specifically, first alignment feature 1214 includes an extension tab having a notch defined therein and second alignment feature 1216 includes a protrusion that is guided into notch by the extension tab. Alternatively, first and second alignment features 1214 and 1216 may be any type of alignment feature that enables coupling 1200 to operate as described herein. In operation, removal of circuit breaker 1102 from housing 1104 causes alignment features 1214 and 1216 to automatically disengage from each other. Similarly, racking circuit breaker 1102 into housing 1104 causes alignment features 1214 and 1216 to automatically engage and couple first connector 1202 to second connector 1204. Specifically, first alignment feature 1214 mates with second alignment feature 1216 when circuit breaker 1102 is moved from the disconnected position to the connected position to enable high speed data transmission through first connector 1202 and second connector 1204. In situations where first connector 1202 is misaligned with second connector 1204 by more than a predetermined tolerance, alignment features 1214 and 1216 prevent connectors 1202 and 1204 from mating.

In the exemplary embodiment, first connector 1202 also includes a first engagement feature 1218 that engages with a second engagement feature 1220 on second connector 1204. Engagement features 1218 and 1220 facilitate to coupling first connector 1202 to second connector 1204 such that engagement features 1218 and 1220 take the place of a standard engaging tab on a high speed cable. More specifically, first engagement feature 1218 includes a boss having a pair of inclined surfaces and second engagement feature 1220 includes a biasing mechanism that travels up the inclined surfaces of the boss and snap fits around boss. Alternatively, first and second engagement features 1218 and 1220 may be any type of engagement feature that enables coupling 1200 to operate as described herein. Furthermore, coupling 1200 may only include engagement features 1218 and 1220 when coupling 1200 is used with an Ethernet high speed communication connector. In the exemplary embodiment, engaging features 1218 and 1220 are located on a side of connectors 1202 and 1204 that is oriented substantially normal to the side of connectors 1202 and 1204 on which alignment features 1214 and 1216 are positioned. Alternatively, engaging features 1218 and 1220 are positioned on any side of connectors 1202 and 1204, respectively, which facilitate operation of coupling 1200 as described herein.

Figure 16:
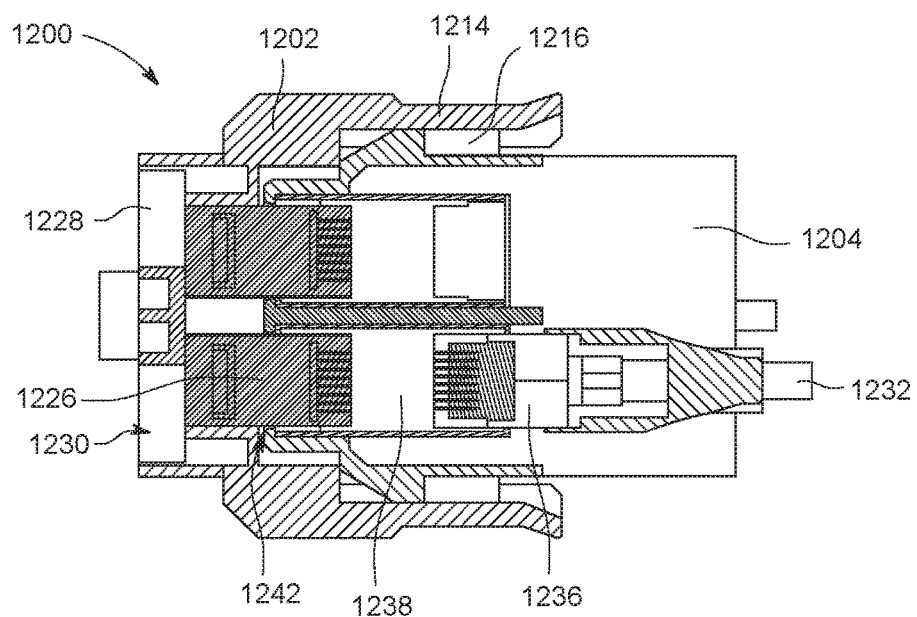
FIG. 16 is a cross-sectional view of the high speed communications coupling shown in FIG. 12.

Referring to FIG. 12, a first cable 1222 includes a first end 1224 coupled to an electronics module (not shown) and a second end 1226 coupled to first connector 1202. More specifically, first connector 1202 includes an insert 1228 that defines an opening 1230 through which second end 1226 of cable 1222 is inserted. Similarly, a second cable 1232 includes a first end 1234 coupled to an electronics module (not shown) and a second end 1236 (shown in FIG. 16) coupled to second connector 1204. Referring now to FIG. 14 and FIG. 16, which is a cross-sectional view of high speed communications coupling 1200, coupling 1200 includes a pair of couplers 1238 that are configured to coupled second end 1226 of first cable 1222 and second end 1236 of second cable 1232 within second connector 1204. More specifically, a front face 1240 of second connector 1204 includes an opening 1242 defined therein through which second end 1226 of first cable 1222 is inserted to engage first end 1226 with coupler 1238. Second connector 1204 includes an opening 1242 for each coupler 1238. In the exemplary embodiment, two couplers 1238 are provided to enable two different high speed data communications path to be transmitted through coupling 1200. Alternatively, coupling 1200 may have any number of couplers 1238 that facilitate operation of coupling 1200 as described herein. In the exemplary embodiment, coupler 1238 is a standard coupler user to connect two male ends of a high speed communications cable. Alternatively, coupler 1238 may be any coupler able to connect two male ends of a high speed communications cable.

Figure 17:
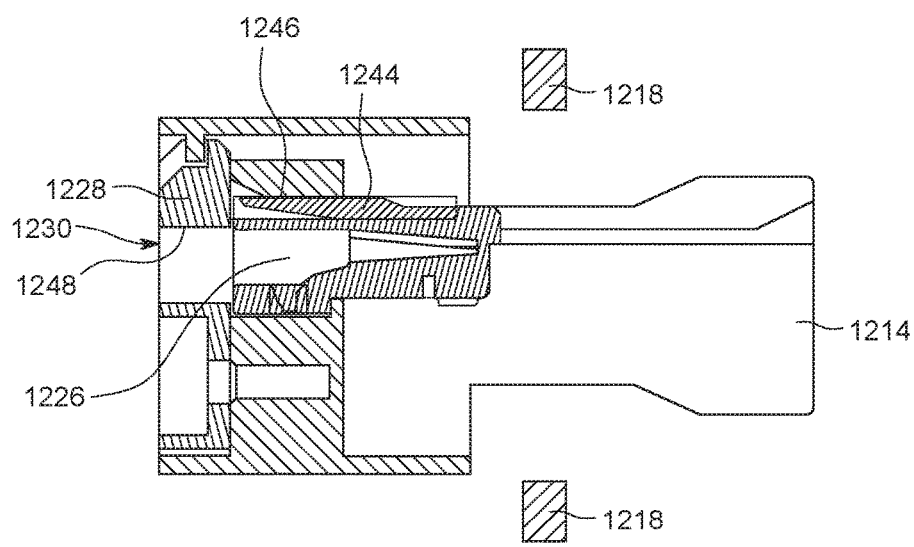
FIG. 17 is cross-sectional view of the first connector shown in FIG. 13.

FIG. 17 is cross-sectional view of first connector 1202 along line 17-17 shown in FIG. 15. For simplicity, second connector 1204, cable 1222, and coupler 1238 are not shown in FIG. 17. In the exemplary embodiment, second end 1226 of first cable 1222 includes a biasable tab 1244 that is configured to be depressed upon entry into a standard plug and then rise up to snap fit second end 1226 into a connector. However, in order to for second end 1226 to automatically disengage and maintain the self-aligning and self-coupling features described above, it is desirable for tab 1244 to remain depressed. As such, in the exemplary embodiment, first connector 1202 includes a depressing mechanism 1246 configured to maintain tab 1244 in a biased, depressed, position, as shown in FIG. 17. More specifically, an axial surface 1248 that partially defines opening 1230 biases tab 1244 into the depressed position as second end 1226 is inserted into insert 1228. As a distal end of second end 1226 seats into coupler 1238, tab 1244 is guided into a depressing slot 1246 formed on first connector 1202 such that tab is maintained in a depressed position. Alternatively, depressing mechanism 1246 is an inclined surface. Generally, depressing mechanism 1246 is any mechanism that maintains tab 1244 in a depressed position.

Exemplary embodiments of a circuit breaker and method of operating a circuit breaker are described above in detail. The circuit breaker and methods are not limited to the specific embodiments described herein but, rather, components of the circuit breaker and/or operations of the methods may be utilized independently and separately from other components and/or operations described herein. Further, the described components and/or operations may also be defined in, or used in combination with, other systems, methods, and/or devices, and are not limited to practice with only the circuit breaker systems as described herein.

Described herein is a circuit breaker assembly for use in electrical switchgear. The circuit breaker assembly includes a cassette and a circuit breaker coupled within the cassette. The circuit breaker is moveable between a connected position and a disconnected position. The circuit breaker assembly also includes a first secondary disconnect apparatus pivotally coupled to the cassette and including at least one high speed communications connector. A second secondary disconnect apparatus is coupled to the circuit breaker and includes a second coupling portion removably coupled to the first coupling portion. The second coupling portion includes at least one opening configured to receive the high speed communications connector when the circuit breaker is moved from the disconnected position to the connected position to enable real time data transmission through the first coupling portion and the second coupling portion.

Accordingly, the circuit breaker assembly described herein, and more specifically, the high speed communications coupling, embeds high speed data communications, such as but not limited to Ethernet and HDMI, directly into the circuit breaker electronics. As such, the high speed communication couplings enables real time transmission of high speed communications data.

Exemplary embodiments of a circuit breaker assembly and method of assembling a circuit breaker are described above in detail. The circuit breaker assembly and methods are not limited to the specific embodiments described herein but, rather, components of the circuit breaker assembly and/or operations of the methods may be utilized independently and separately from other components and/or operations described herein. Further, the described components and/or operations may also be defined in, or used in combination with, other systems, methods, and/or devices, and are not limited to practice with only the circuit breaker systems as described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A secondary disconnect assembly for use with a circuit breaker moveable between a connected position and a disconnected position, said secondary disconnect assembly comprising:
   a first secondary disconnect apparatus comprising:
      a first coupling portion comprising a body portion integrally formed with said first secondary disconnect apparatus, wherein said body portion at least partially houses at least one high speed communications connector, said first coupling portion further comprising a cover coupled to said body portion, configured to restrict movement of said high speed communications connector; and
      a first alignment feature comprising a first pair of angled ramp surfaces; and
   a second secondary disconnect apparatus comprising:
      a second alignment feature configured to couple to said first alignment feature when the circuit breaker is in the connected position, wherein said second alignment feature comprises a second pair of angled ramp surfaces configured to mate with said first pair of angled surfaces when the circuit breaker is in the connected position; and
      a second coupling portion removably coupled to said first coupling portion, said second coupling portion comprising at least one opening configured to receive said high speed communications connector when the circuit breaker is moved from the disconnected position to the connected position to enable high speed data transmission through said first coupling portion and said second coupling portion.

2. The secondary disconnect assembly in accordance with claim 1, wherein said second coupling portion comprises a body portion and at least one coupler at least partially housed within said body portion, said body portion integrally formed with said second secondary disconnect apparatus.

3. The secondary disconnect assembly in accordance with claim 2, wherein said body portion comprises a first body opening and a second body opening, said coupler comprising a first coupler opening aligned with said first body opening and a second coupler opening aligned with said second body opening.

4. The secondary disconnect assembly in accordance with claim 3, wherein said first body opening is oriented substantially perpendicular to said second body opening.

5. The secondary disconnect assembly in accordance with claim 3, wherein said first body opening and said first coupler opening are configured to receive said high speed communications connector when the circuit breaker is in the connected position.

6. The secondary disconnect assembly in accordance with claim 2, wherein said body portion comprises a wall having a slot defined therein and said coupler comprises a projection configured to engage said slot to facilitate coupling said coupler to said body portion.

7. A circuit breaker assembly comprising:
   cassette;
   a first secondary disconnect apparatus pivotally coupled to said cassette, said first secondary disconnect apparatus comprising a first coupling portion comprising:
      at least one high speed communications connector;
      a body portion integrally formed with said first secondary disconnect apparatus and configured to at least partially house said high speed communications connector; and
      a cover coupled to said body portion, said cover configured to restrict movement of said high speed communications connector;
   a circuit breaker removably coupled within said cassette, said circuit breaker moveable between a connected position and a disconnected position; and
   a second secondary disconnect apparatus coupled to said circuit breaker, said second secondary disconnect apparatus comprising a second coupling portion removably coupled to said first coupling portion, said second coupling portion comprising at least one opening configured to receive said high speed communications connector when said circuit breaker is moved from the disconnected position to the connected position to enable high speed data transmission through said first coupling portion and said second coupling portion.

8. The circuit breaker assembly in accordance with claim 7, wherein said second coupling portion comprises a body portion and at least one coupler at least partially housed within said body portion, said body portion integrally formed with said second secondary disconnect apparatus.

9. The circuit breaker assembly in accordance with claim 8, wherein said body portion comprises a first body opening and a second body opening, said coupler comprising a first coupler opening aligned with said first body opening and a second coupler opening aligned with said second body opening, wherein said first body opening and said first coupler opening are configured to receive said high speed communications connector when said circuit breaker is in the connected position.

10. The circuit breaker assembly in accordance with claim 7, wherein said first secondary disconnect apparatus comprises a first alignment feature and said second secondary disconnect apparatus comprises a second alignment feature configured to couple to said first alignment feature when the circuit breaker is in the connected position.

11. A method of assembling a circuit breaker assembly, said method comprising:
   pivotally coupling a first secondary disconnect apparatus to a cassette, the first secondary disconnect apparatus including a first coupling portion including at least one high speed communications connector;

removably coupling a circuit breaker to the cassette, wherein the circuit breaker is moveable between a connected position and a disconnected position;

coupling a second secondary disconnect apparatus to the circuit breaker, the second secondary disconnect apparatus including a second coupling portion;

integrally forming a body portion of the second coupling portion with the second secondary disconnect apparatus, the body portion having a first body opening and a second body opening;

coupling a coupler to the body portion such that the body portion at least partially houses the coupler, the coupler having a first coupler opening and a second coupler opening;

aligning the first body opening with the first coupler opening and the second body opening with the second coupler opening; and removably coupling the second coupling portion to the first coupling portion, wherein the second coupling portion includes at least one opening configured to receive the high speed communications connector when the circuit breaker is moved from the disconnected position to the connected position to enable high speed data transmission through the first coupling portion and the second coupling portion.

12. The method in accordance with claim 11 further comprising:
integrally forming a body portion of the first coupling portion with the first secondary disconnect apparatus; and
coupling a cover to the body portion of the first coupling portion such that the cover restricts movement of said high speed communications connector.

13. The method in accordance with claim 11 further comprising inserting the high speed communications connector into the first body opening and the first coupler opening as the circuit breaker moves from the disconnected position to the connected position.

14. The method in accordance with claim 11 further comprising removably coupling a first alignment feature of the first secondary disconnect apparatus with a second alignment feature of the secondary disconnect apparatus when the circuit breaker is in the connected position.

\* \* \* \* \*